(12) United States Patent
Ramp

(10) Patent No.: US 6,431,287 B1
(45) Date of Patent: Aug. 13, 2002

(54) SOIL TILLER ASSEMBLY AND METHOD FOR TILLING SOIL

(76) Inventor: Russell Ramp, 784 Brenda Ave., Auburn, IL (US) 36830

( * ) Notice: Subject to any disclaimer, the term of this patent is extended or adjusted under 35 U.S.C. 154(b) by 0 days.

(21) Appl. No.: 09/543,614

(22) Filed: Apr. 5, 2000

(51) Int. Cl.$^7$ ................................................. A01B 9/00
(52) U.S. Cl. ...................... 172/133; 172/107; 172/112; 172/509; 172/701
(58) Field of Search ................................. 172/133, 145, 172/148, 149, 151, 152, 153, 154, 158, 160, 518, 776, 107, 106, 112, 509, 701, 574

(56) References Cited

U.S. PATENT DOCUMENTS

| | | | |
|---|---|---|---|
| 333,927 A | * 1/1886 | Currier ........................ | 172/574 |
| 4,624,197 A | * 11/1986 | Drake ........................ | 172/776 |
| 4,702,323 A | * 10/1987 | Smit et al. .................. | 172/156 |
| 5,255,617 A | * 10/1993 | Williams et al. ............ | 111/140 |
| 5,524,711 A | * 6/1996 | Harris ......................... | 172/149 |
| 5,590,721 A | * 1/1997 | Van Mill .................... | 172/148 |

FOREIGN PATENT DOCUMENTS

GB      2079572    * 1/1982 .................. 111/187

OTHER PUBLICATIONS

Pfost, "Ridge–Till Tips", University of Missouri Extension, Agricultural Publication G1652, Oct. 1993.*

* cited by examiner

Primary Examiner—Robert E. Pezzuto
Assistant Examiner—Nathan Mammen
(74) Attorney, Agent, or Firm—Robert J. Veal; Christopher A. Holland; Burr & Forman LLP

(57) ABSTRACT

A soil tiller assembly for plowing multiple independent rows of soil includes a frame and attached thereto a coulter, a pair of tiller discs, a pair of secondary coulters, and a tilling assembly including a tiller wheel. The perimeter of the tiller wheel has a plurality of blades attached thereto, and the blades are rotated in the direction opposite each of the other blades described above. The soil tiller assembly is used to build up separate rows of plowed soil, which will prevent overtilling of the soil. Furthermore, the preferred method of operation allows the operator to build multiple rows of soil, delay contact of the soil for several months, and then plant seed in the rows of soil, such that the soil will receive required nutrients during the period of delay while further limiting erosion.

36 Claims, 7 Drawing Sheets

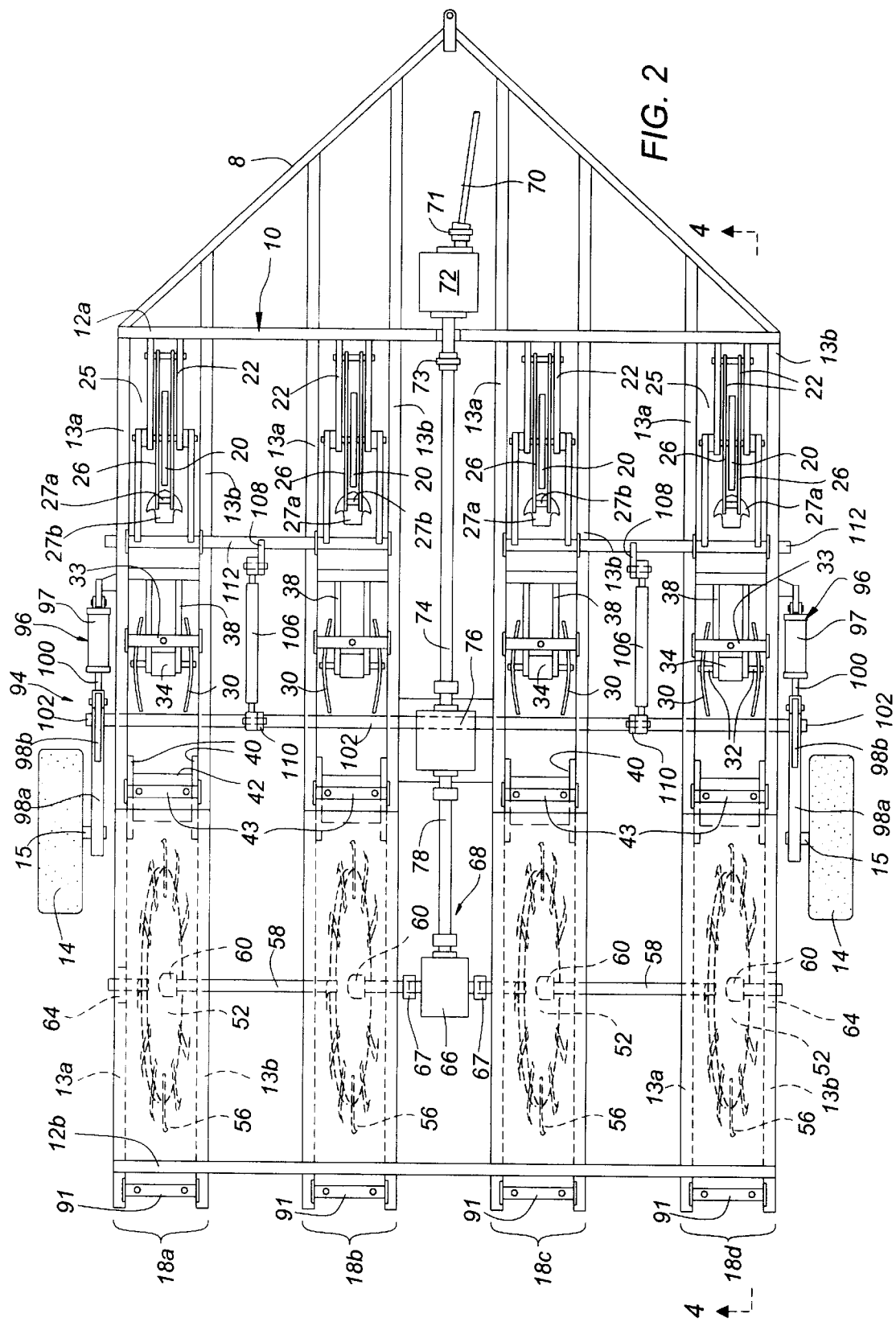

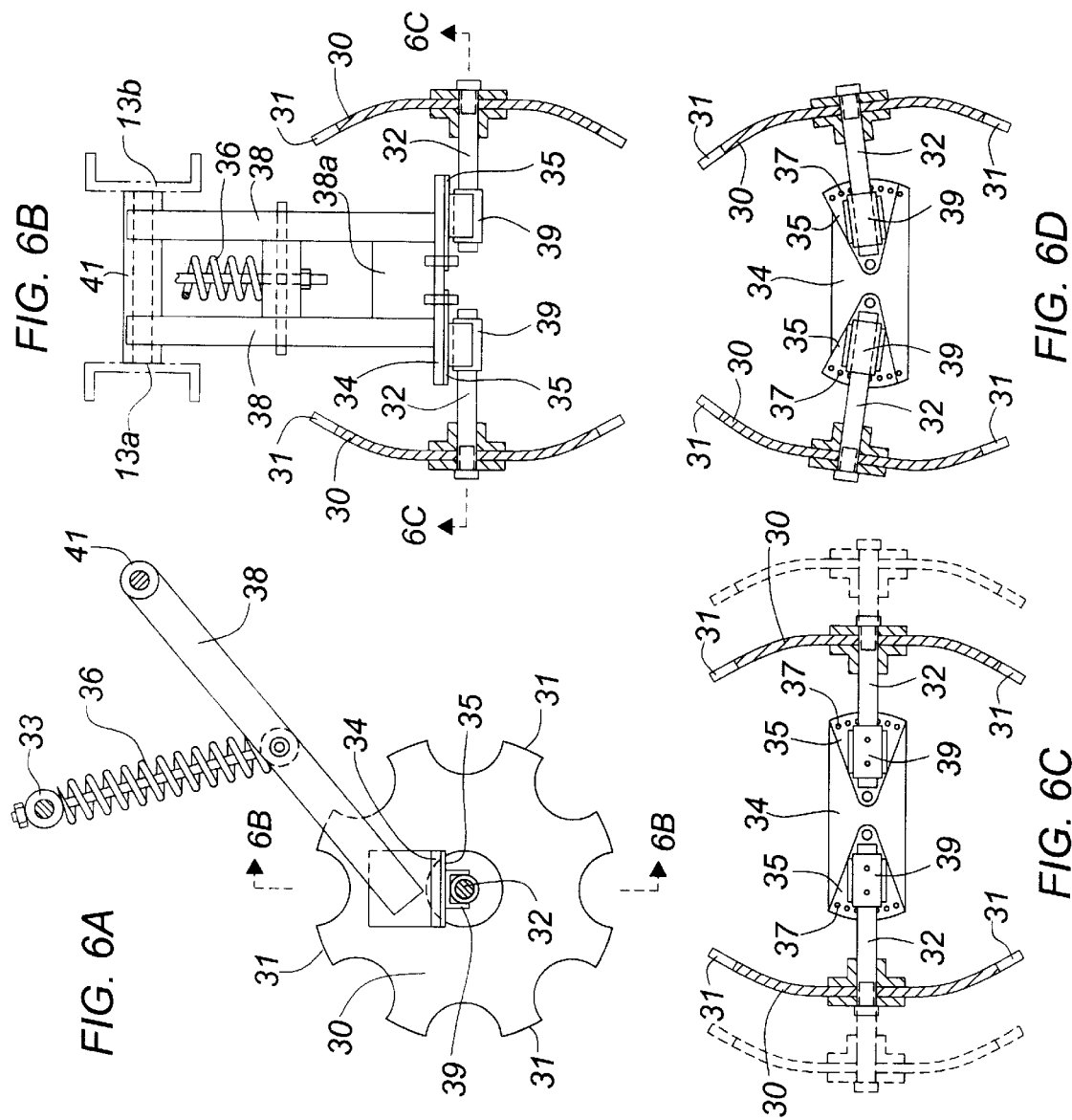

SOIL TILLER ASSEMBLY AND METHOD FOR TILLING SOIL

FIELD OF THE INVENTION

The present invention relates to agricultural tillage equipment and a method for using the tillage equipment to till a ground surface, and, more particularly, an improved soil tiller and method of using said soil tiller to produce a seed bed having a series of separate and distinct rows of soil that are able to encourage growth of desired vegetation.

BACKGROUND OF THE INVENTION

The most important element in agricultural production is the condition of the soil in which crops are planted, which is determined by the tilling of the soil as well as by the weather or climate surrounding the soil. Soil types vary from coarse particles (such as gravel and sand) to fine particles that easily join together (such as to form clay). The clay particles (which make up only a small percentage of the soil) act as a binder to hold the variety of differing soil particles together. As a result, the greater the amount of clay in the soil, the greater the adhesion of the soil particles to each other. When the soil and clay particles are moist, it is easy for them to be compacted by traffic of field tillage equipment, but it is difficult to return to its original structure. Moreover, when the compacted soil dries, it becomes very hard and plant roots cannot penetrate in search of water and plant food. This hardness of the soil becomes a problem because all healthy plants require a moist and healthy root environment to supply water and chemical compounds to the plants, meaning that plants benefit greatly from a row of soil that acts as a sponge to receive water in the row and direct the water into the sub-soil below the row of soil. In order to accommodate the seed or plants, the plants must be placed in soil that is loose and at the correct temperature for germination and root environment. Moreover, the soil available for sufficient root systems to develop must be porous to permit all the free movement of water and air in the soil. Such soil will supply water and food and also make it possible for the roots to take the path of least resistance to obtain these two components from the soil.

It is commonly known that excessive tillage in an area of farmland will tend to reduce the production of the land for farming due to the overtilling of the land. The continued pulverization of soil will break down the structure of the soil so that the average soil particle will become very small. As a negative result, when rainfall occurs on a collection of these small soil particles, the minute size of the soil particles will cause the soil particles to easily join and cake when dried, which will compact the soil and make the soil hard, consequently reducing the soil's capacity for absorbing and retaining water for vegetation planted in the soil, and making it difficult for any crops to grow in the poor root environment. These principles notwithstanding, most soil tillers are implemented to completely and thoroughly till the soil to the extent necessary to prepare the soil for planting seeds. This common method therefore leads to the problem of overtillage of the ground surface.

One established method for preparing soil for planting crops includes the method whereby soil was tilled in the fall by turnover of the soil with a moldboard plow or similar tillage tool which could completely or partially incorporate the surface residue into the soil. Using this process, the entire soil surface must be tilled rather than a portion of the surface. In the preparation of soil for seeding or planting a crop, the entire surface is prepared by a variety of methods with a seed tillage tool such as a mold board plow, a disc plow, a one way disc barrow, tandem discs barrow, chisel plow, spike tool barrow, field cultivator or other special tools. All of these tools have to be used for a wide range of soil conditions.

What is needed, then, and not found in the prior art, is an improved soil tiller and a method for tilling soil that operates to prepare a plurality of separate and distinct rows of soil along the width of the tiller while also providing inner rows of untilled ground between the tilled rows such that the soil will not be compacted and hardened as a result of overtilling.

SUMMARY OF THE INVENTION

An object of the present invention is to provide an improved soil tiller having tilling blades separated at a prescribed distance to form a series of independent rows of tilled soil.

A further object of the present invention is to provide a method for tilling a field with such a tiller so that certain rows of soil are tilled while inner rows are left untilled to encourage the collection of water in the soil.

Another objective of the present invention is to provide a tilling apparatus capable of tilling a series of independent rows for planting seed without tilling the space between the adjacent rows of tilled soil and to provide a greater area for the roots to absorb water and chemical compounds.

A further object of the present invention is to provide a tilling apparatus that reduces the area of land required to be tilled by fifty percent or more as compared to conventional tiller systems.

Another object of the present invention is to provide a tilling apparatus that reduces compaction of soil for planting crops.

These and other objects of the invention are accomplished through a soil tiller having a plurality of blades for building a series of rows of soil as desired by the user and as required by the conditions of the soil. The tiller includes a frame and a means for preparing a plurality of rows of soil, with a determined distance separating each of the adjoining rows. The tiller is designed such that, when pulled behind a tractor or similar vehicle, a coulter will initially penetrate the ground surface to prepare it for building the row. A pair of tiller discs are attached to the frame in alignment with the coulter, and the tiller discs operate to further provide the desired soil and residue surface. The tiller discs are concave discs that are adjustable to move the soil and surface residue into the desired row area. Furthermore, a series of secondary discs having a sharp surrounding perimeter are provided after the tiller discs to further engage any undesired trash or plant residue that might remain on the cutting surface of the soil. Finally, a tiller wheel is positioned in alignment with the coulter and tiller discs, and the tiller wheel serves to further build up the row of soil. The perimeter of the tiller wheel has a plurality of blades attached thereto, and the blades are rotated in the direction opposite to the ground driven tiller discs each of the other tillage implements described above. A series of shields are provided at the side of the tiller wheel and attached blades so as to prevent the discharge of soil outside the desired row area.

This invention is particularly useful for any soil whose clay content involves tillage problems when the soil is too wet, and the method to be used with this tiller to prepare the soil is to produce a crop economically and also gain quantity and quality. Once the soil has been compacted due to prior farming operations, it requires a great deal of time and effort to compensate for the damage along with a special effort to avoid future soil compaction. It is therefore essential that a tillage time schedule be established to restrict soil operations to the period when least damage will be done to the soil by working the soil when wet.

The present invention increases the volume of the soil in the row ridge by increasing the depth of tilling and by including sub-soil with surface soil to increase the total volume of soil which provides a greater area for plant roots. The soil ridge formed in the fall is very rough and is not intended to provide loose soil as needed for planting seed. After the rows have been formed, no further operation will be needed until spring planting except the operations needed for weed control. The break-up of the soil for a spring planting is done by weathering during the fall, winter, and spring by the wetting, drying, freezing and thawing. This procedure is the same as the weathering process that takes place when a moldboard plow is used as the first soil preparations in the fall.

Once the tiller has passed over a tract of land, the soil will be prepared in multiple rows. This division of the soil between tilled rows and untilled rows by the tiller is beneficial in that energy is not wasted in tilling soil that will not be used, and the soil is further not overtilled so as to cake and become hard after a period of rainfall.

BRIEF DESCRIPTION OF THE DRAWINGS

An improved soil tiller and method for using said improved soil tiller assembly embodying the features of the present invention is depicted in the accompanying drawings which form a portion of this disclosure and wherein:

FIG. 2 is a top plan view of the improved soil tiller of the present invention, with a portion of the tilling assembly being illustrated in phantom;

FIG. 6A is a side elevational view of one tiller disc of the pair of tiller discs of the present invention;

FIG. 6B is a rear elevational view of the pair of tiller discs of the present invention, this view illustrating the spring connection between the tiller disc and the frame;

FIG. 6C is a top view of the pair of tiller discs of the present invention attached to a positioning plate, the view illustrating the ability of the tiller discs to extend (as shown in phantom); and FIG. 6D is a top view of the pair of tiller discs of the present invention attached to a positioning plate, the view illustrating the angular displacement of the tiller discs to till the desired soil.

DESCRIPTION OF THE PREFERRED EMBODIMENTS

Figure 1A:
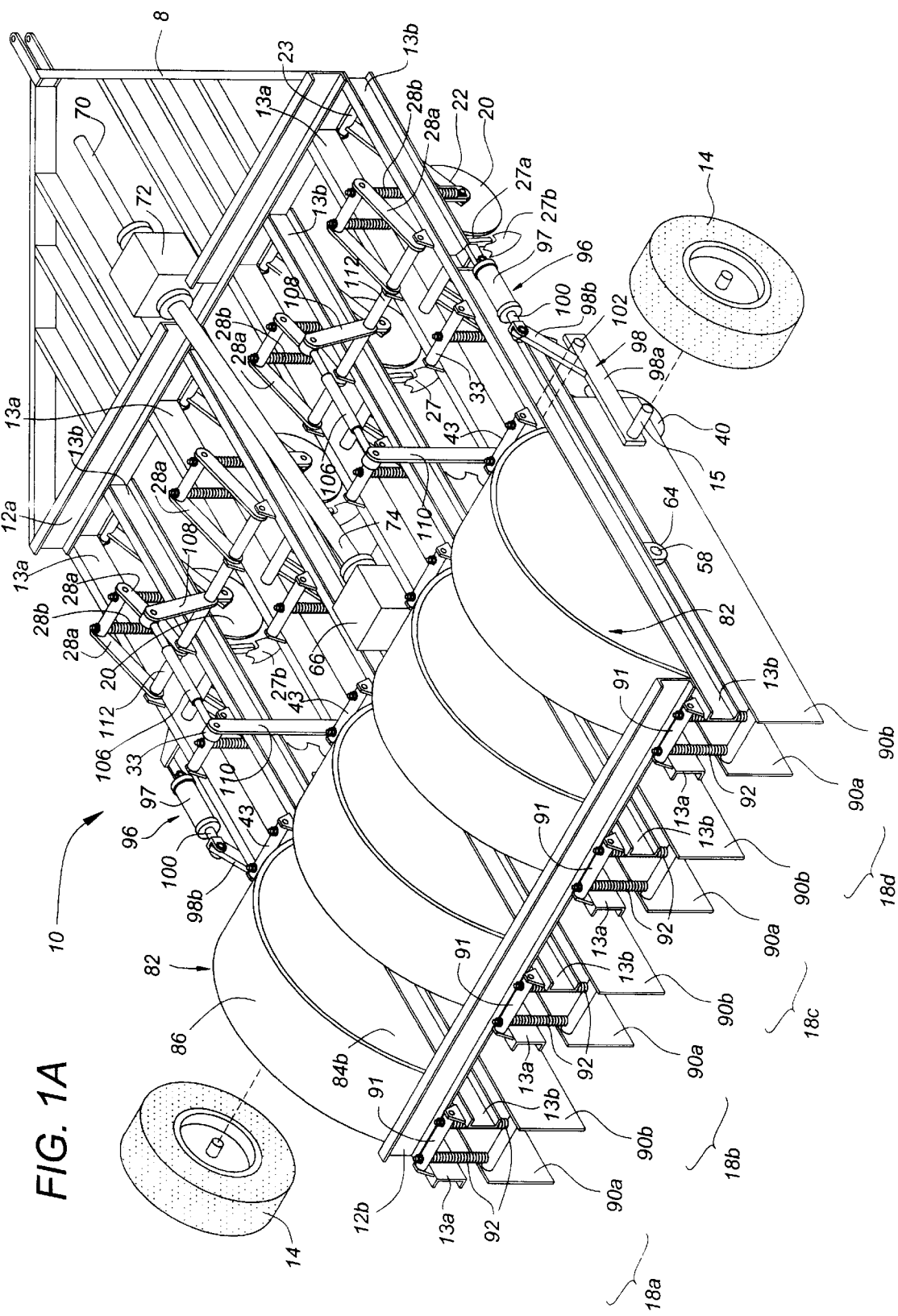
FIG. 1A is a perspective view of the improved soil tiller of the present invention.
Figure 1B:
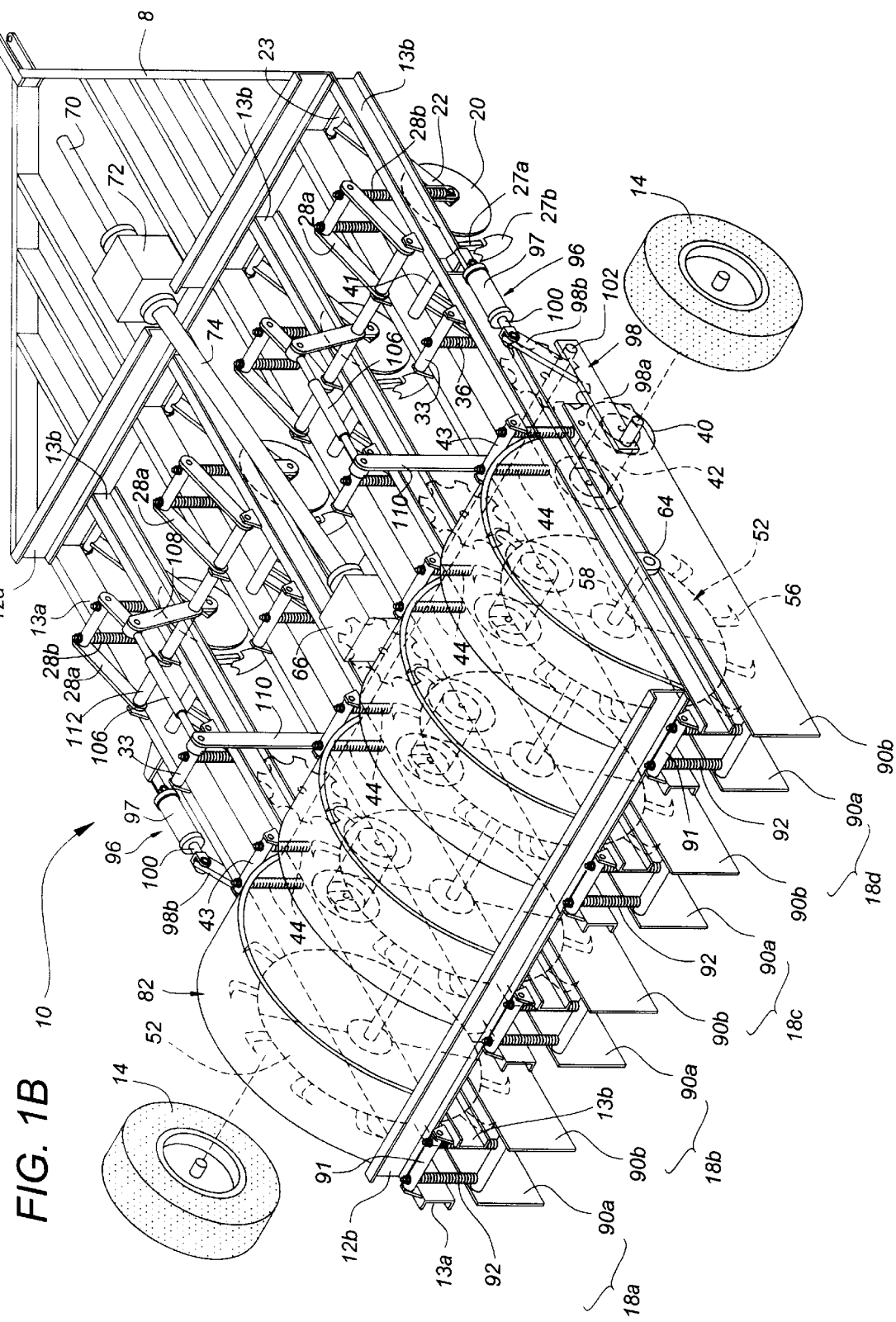
FIG. 1B is a perspective view of the improved soil tiller of the present invention as shown in FIG. 1A, with the cutting wheels illustrated in phantom.
Figure 5A:
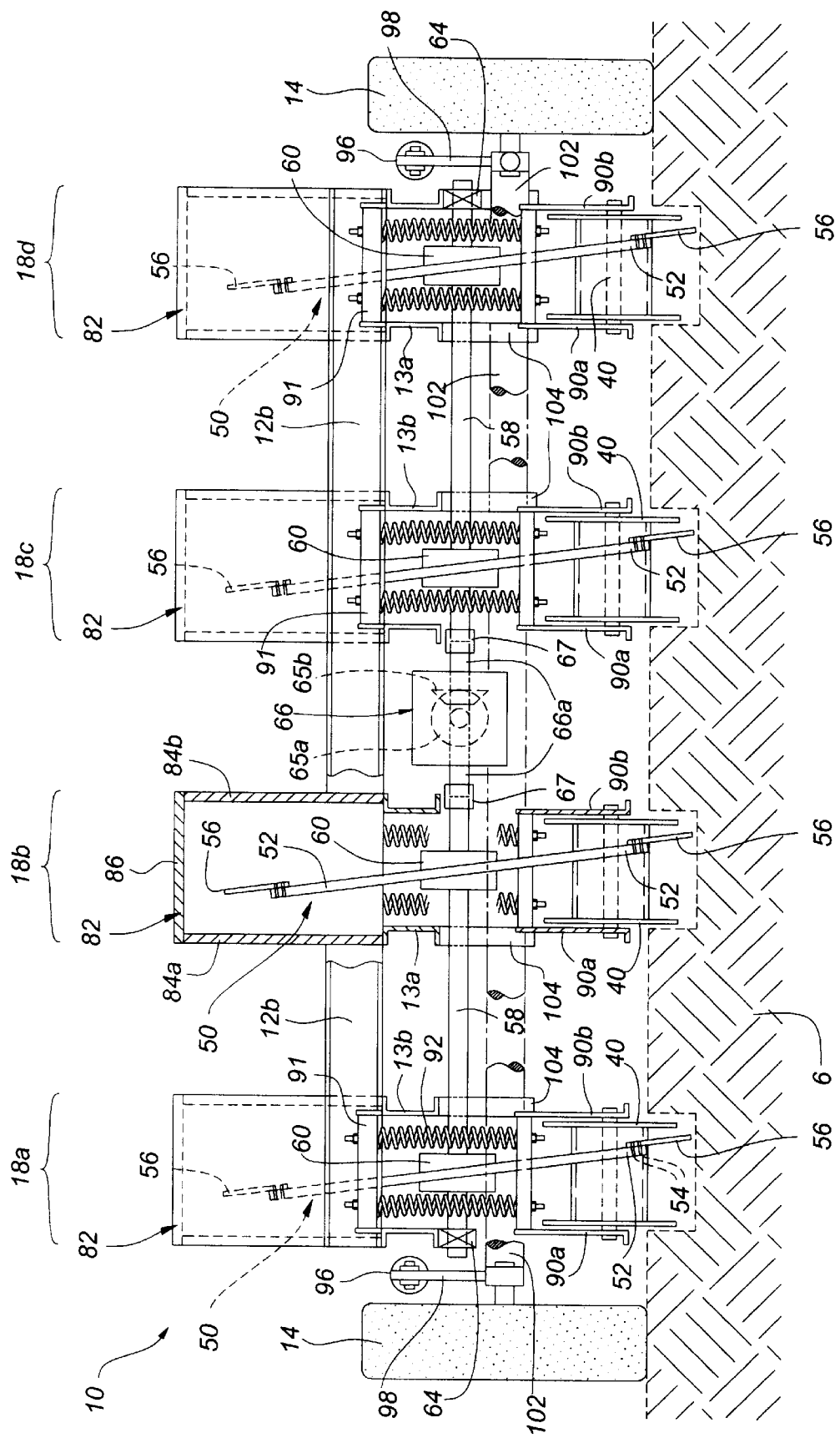
FIG. 5A is a rear elevational view of the improved soil tiller of the present invention, including a sectional view of the tilling assembly 18b.
Figure 5B:
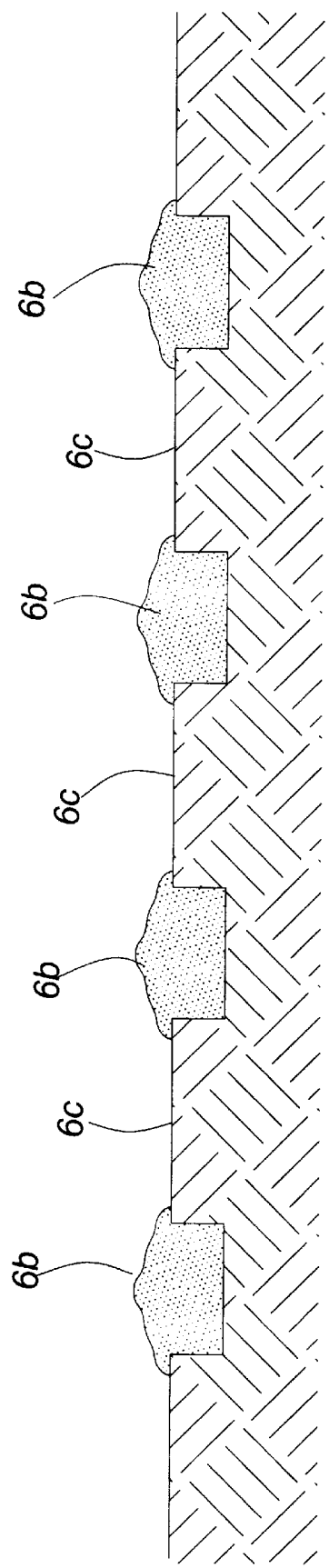
FIG. 5B is a view of the prepared rows of soil after the improved soil tiller illustrated in FIG. 5A has crossed over the soil.

Referring to FIG. 1A, a perspective view of the row tiller assembly 10 of the present invention is illustrated. The row tiller assembly 10 is designed to be pulled by a tractor (not illustrated) to plow multiple rows of soil 6 (as illustrated in FIGS. 5A and 5B) for planting seeds to grow various types of farm crops and vegetation (not illustrated). Looking at FIG. 1B, the same perspective view of FIG. 1A is shown, with a portion of the means for tilling the soil 6 shown in phantom.

Referring now to FIG. 2, a top plan view of the row tiller assembly 10 illustrates several separate elements of the present invention that are used to provide multiple separate rows of prepared soil 6 once the row tiller assembly 10 has passed over an area of the soil 6. The row tiller assembly 10 includes a frame having a pair of cross-beam supports 12a, 12b and a plurality of longitudinally extending frame beams 13, including outermost beams 13a and 13b serving as the foundation for the other elements of the row tiller assembly 10. The row tiller assembly 10 further includes a plurality of in-line tilling assemblies 18a–18d for preparing a defined row of soil 6. In the preferred embodiment, the row tiller assembly 10 includes four tilling assemblies 18a–18d that are used to form rows of soil 6 that are approximately eight to twelve inches wide. A pair of support wheels 14 are additionally individually attached to the outermost beams 13a, 13b via a pair of wheel spindles 15, and the support wheels 14 act as a depth control means and to allow the row tiller assembly 10 to be pulled behind a standard tractor or similar vehicle.

Looking at FIGS. 1A, 1B, 3, and 4, the row tiller assembly 10 further includes a height adjustment means 96 for controlling the elevation of the frame of the tilling assembly 18a–18d with respect to the support wheels 14 and the soil 6 to be tilled. Lift wheel axle 102 extends transversely of the tilling assemblies 18a–18d and is rotatably connected to the tilling assemblies 18a–18d with appropriate journals 104. Affixed to each end of axle 102 are wheel lift arm assemblies 98 which carry spindles 15. The height adjustment means 96 preferably includes a hydraulic cylinder 97 connected to the outermost longitudinal beams 13a, 13b of the tilling assembly 18a and 18d, and lift arm assembly 98, comprising a lift arm 98a affixed to axle 102 and an attached dog 98b, cylinder 97 is connected to dog 98b to urge lift arm 98a about the axis of lift wheel axle 102 and vary the height of the frame. The hydraulic cylinder 97 includes a piston (not shown) positioned inside of the hydraulic cylinder 97 and a piston rod 100 having one end attached to the piston inside the hydraulic cylinder 97 and the other end pivotally attached to the dog 98b of the lift arm assembly 98.

Looking at FIG. 5A, the central shaft 102 is attached to a series of bottom flanges or journals 104 that are attached to each longitudinal beam 13 of the row tiller assembly 10. The lift arms 98a are attached to the central shaft 102 so that the lift arm assemblies 98 on both sides of the row tiller assembly 10 are synchronized to maintain a consistent depth of tilling of the four rows of soil.

As stated above, the frame includes the first and second cross-beam support 12a and 12b that serve as foundational elements, and first cross beam support 12a is connected to second cross beam support 12b by the cross beams 13 of each tilling assembly 18a–18d. Each tilling assembly 18a–18d is supported on two longitudinal beams 13a, 13b that support each element used to produce a row of soil 6. The space between each adjacent tilling assembly 18a–18d is preferably approximately thirty inches, although the distance can be determined according to the crop needs of the user determined by the row of soil 6 to be prepared, which vary according to factors such as the climate in the local area, the condition of the soil 6 in the local area, and the crops that are to be grown. Preferably, the distance between each adjoining tilling assembly 18a–18d will be no less than twenty-four inches but not more than thirty-six inches. Additionally, the row tiller assembly 10 of the preferred embodiment will have four sets of adjoining tilling assemblies 18a–18d.

Each tilling assembly 18a–18d includes several elements connected between the longitudinal beams 13a, 13b for preparing a row of soil 6. Looking at FIGS. 3 and 4, each tilling assembly 18a–18d includes a coulter 20 for initially penetrating the surface of the soil 6. Attached proximate to the coulter 20 is a sweep or tool holder 27A and an agitating tool 27B that contact and agitate the soil 6 following the coulter 20. Each tilling assembly 18a–18d additionally includes a pair of tiller discs 30 that are used to move the soil 6 after the coulter 20. After the pair of tiller discs 30, a pair of secondary coulters 40 are provided to further cut any trash or plants not engaged by either the coulter 20 or the tiller discs 30. The last cutting element of each tilling assembly 18 is a tiller wheel assembly 50 that is used to finish the preparing the soil 6 and building up a row ridge of soil 6 for later receiving the seeds to be planted.

Figure 4:
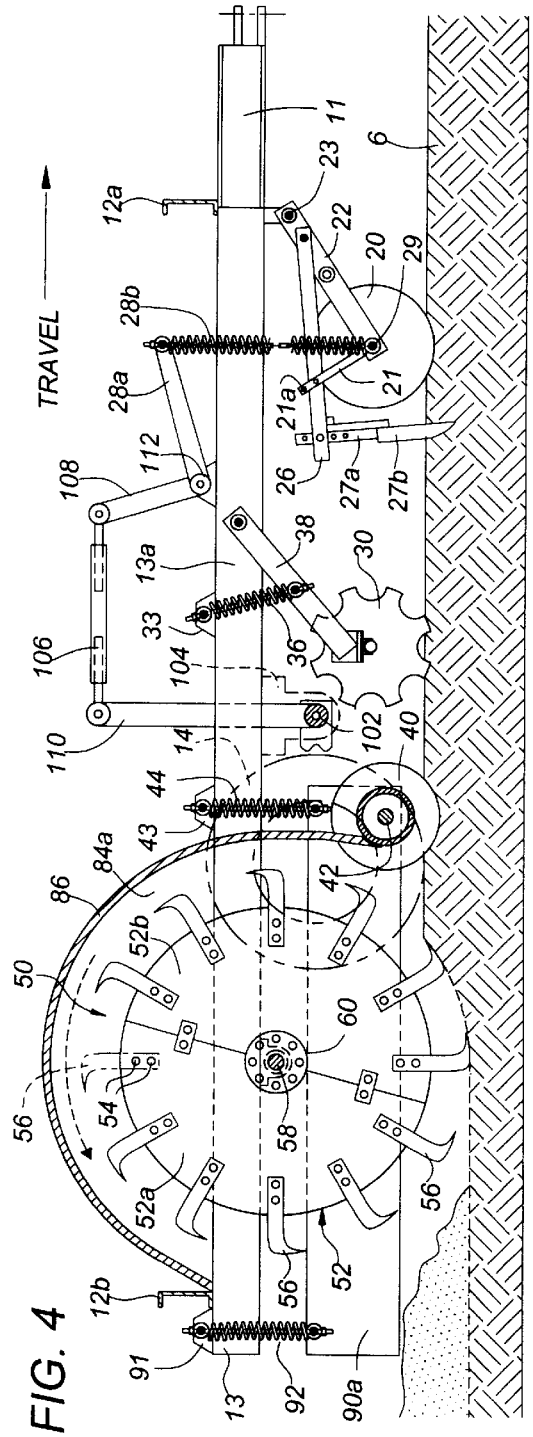
FIG. 4 is a sectional side elevational view of the improved soil tiller of the present invention taken along the lines 4—4 of FIG. 2, this view showing the arrangement of the tilling assembly connected to the frame.

Referring to FIG. 4, the coulter 20 is mounted to the longitudinal beams 13a, 13b via a connecting arm 22. The coulter 20 rotates around a coulter shaft 29, which is mounted on one end of the connecting arm 22, while the opposing end of the connecting arm 22 is pivotally connected at 23 between beams 13. Each coulter 20 is attached to a pivoting shaft transverse 112 that, in conjunction with lift wheel assembly 98, controls the depth in which the coulter 20 engages the soil 6. Each coulter 20 is connected to the pivoting shaft 112 by a link 28a and a pair of spring rod 28b. A first end of the link 28a is affixed to the pivoting shaft 112, while a second end of the link 28a is pivotally connected to a first end of the spring rod 28b. A lower end of the spring rod 28b is connected to coulter shaft 29 upon which the coulter 20 is rotatably mounted. As a result, the rotation of the pivoting shaft 112 will cause the pivoting of the link 28a varying the elevation of the spring rod 28b and thereby varying the depth of the coulter 20. A linking assembly, including distal linking arm 110, turnbuckle 106, and proximal linking arm 108, is connected between the lift wheel axle 102 and the pivoting shaft 112, such that movement of the lift wheel axle 102 to change elevation of the frame will rotate the pivoting shaft 112 as described above. The first end of the distal linking arm 110 is affixed to the lift wheel axle 102, while the second end of the distal linking arm 110 is connected to the first end of the turnbuckle 106. The second end of the turnbuckle 106 is connected to a first end of the proximal linking arm 108, and the second end of the proximal linking arm 108 is connected to the pivoting shaft 112. As a result, when the lift wheel axle 102 rotates, the distal linking arm 110 will also rotate, causing the turnbuckle 106 and the proximal linking arm 108 to rotate as well. The proximal linking arm 108 therefore causes the pivoting shaft 112 to rotate, thereby altering the elevation of the coulter 20 as described above.

In the preferred embodiment of the invention, there is one pivoting shaft 112 connected to one of the adjoining pair of tilling assemblies 18a–18b and 18c–18d (see FIG. 2). Each pivoting shaft 112 requires one linking arm 110, one turnbuckle 106, and one proximal linking arm 108 to effect the rotation of the pivoting shaft 112. Additionally, the length of the turnbuckle 106 may be varied to modify how much rotation of the pivoting shaft 112 is required to vary the elevation of the coulters 20.

Looking at FIG. 4, a tool holder 27A is connected to the connecting arm 22 via a tool arm 26, and the tool holder 27A extends behind the coulter 20. The tool holder 27A is thereby substantially in line and in close proximity with the coulter 20. A channel beam 21 is connected between the tool arm 26 and the connecting arm 22, and the channel beam 21 has a series of varying apertures 21A to provide varied positions for the tool holder 27A to adjust the clearance between the tool holder 27A and the first coulter 20.

The agitating tool 27B is connected to the tool holder 27A and implemented to make contact with the soil 6 after the initial contact by the coulter 20, and the agitating tool 27B further breaks up the soil 6 such that the soil 6 is pushed outward and upward from the center cut row of soil 6 generated by the coulter 20. Moreover, the connection between the tool holder 27A and the tool arm 26 is adjustable with varying adjustments to alter the depth of soil 6 engaged by the agitating tool 27B. The agitating tool 27B itself may be one of several embodiments such as a sweep with wings that can move the surface residues of the row of soil 6 and thus provide a residue free area on the top of the row. The size of the agitating tool 27B will determine the amount of residue that is desirable to be mixed with the soil 6. Under some conditions, it may be advisable to lower the agitating tool 27B to incorporate some surface soil 6. Additionally, the tool holder 27A may also be extended to a position lower than the agitating tool 27B to provide for a chisel-type tool to break-up the soil in a direct line with the coulter 20, but at a greater depth.

Following the coulter 20 is a pair of tiller discs 30 that are preferably used to move soil and residue toward the centerline of the row of cultivated soil 6. Such an arrangement makes it possible for the user to vary the quantity of soil 6 added or subtracted from the row. The mounting and operation of the tiller discs 30 are illustrated in FIGS. 6A–6D. Looking at FIGS. 6A and 6B, a tiller disc shaft 32 is provided having a distal and proximal end, and each tiller disc 30 is mounted the hub of shaft 32. The proximal end of the tiller disc shaft 32 is in turn connected to a positioning plate 34, and the positioning plate 34 is connected, via a pair of connecting arms 38, to a tiller disc mounting bar 41 mounted to the longitudinal beams 13. A loading spring 36 (see FIG. 6A) is additionally attached between each connecting arm 38 and a disc spring mount 33 connected between the longitudinal beams 13 to allow the tiller discs 30 to move up and down when the tiller discs 32 contact a hard surface such as a rock (not shown) during tilling operations. Additionally, an adjustable collar 38A is mounted between the connecting arms 38 to reinforce the attachment of the connecting arms 38 and the positioning plate 34.

Looking at FIGS. 6C and 6D, a pair of top views of the tiller discs 30 connected to the positioning plate 34 are illustrated. The positioning plate 34 is adapted to receive a pair of wedge ends 35 that allow for the adjustment of the angular position of the tiller discs 30. Each wedge end 35 has a series of adjustment bores 37 along the periphery of the wedge end 35, and a hollow mounting sleeve 39 is designed to be mounted to the positioning plate 34. The tiller disc shaft 32 engages the wedge plate 35 via the mounting sleeve 39, wherein the mounting sleeve 39 encircles and secures the tiller disc shaft 32 to permit secure rotation of the tiller disc shaft 32 and the tiller discs 30. The position that the wedge end 35 is engaged to the positioning plate 34 thereby determines the angular position of the tiller discs 32. Looking at FIG. 6C, the tiller disc shaft 32 may be moved inward or outward within the mounting sleeve 39. Consequently, the distance between each tiller disc 30 may also be varied as desired by the user, which varies with the width of the ground tilled by each pair of tiller discs 30.

Referring back to FIG. 6B, each tiller disc 30 is concave in design. Each tiller disc 30 may be attached to the tiller disc shaft 32 such that the perimeter of the tiller disc 30 arcs toward or away from the opposing tiller disc 30 of the tilling assembly 18a–18d, with the view of FIG. 6B illustrating the perimeter of the tiller discs 30 arced toward each other. The position of the tiller disc 30 thereby determines the placement of the soil 6 tilled by the tiller disc 30, either towards a central area (as with the tiller discs 30 illustrated in FIG. 6B) or away from a central area. Furthermore, each tiller disc 30 includes a series of notches 31 surrounding the outer surface of the tiller disc 30 (see FIG. 6A) that aid in distributing the soil 6. Both the concavity of the tiller disc 30 and the notches 31 serve to move the soil surface in such a manner that the soil 6 produces a defined row area. Moreover, each tiller disc 30 can be used to depress the area in the row of soil 6, such as needed for irrigation purposes.

Figure 3:
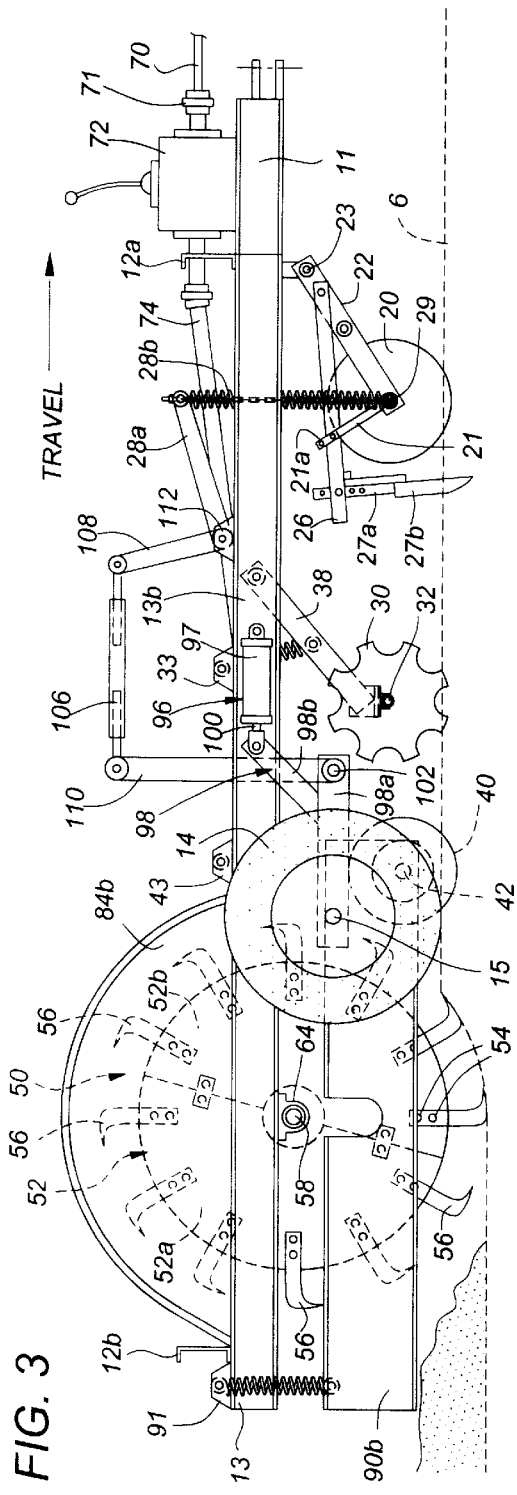
FIG. 3 is a side elevational view of the improved soil tiller of the present invention showing the arrangement of the tilling assembly connected to the frame.

The third member of each tilling assembly 18a–18d is a pair of secondary coulters 40 that are most clearly illustrated in FIGS. 3 and 4. The secondary coulters 40 operate in a similar fashion as the coulter 20 in that the secondary coulters 40 engage the soil 6 and surrounding materials to cut and destroy any undesired materials, such as trash or plants that have not been cut or removed, thereby preparing the soil for the tiller wheel assembly 50. Each secondary coulter 40 of the pair is connected to the opposing secondary coulter 40 by a secondary shaft 42, and the secondary shaft 42 is connected between a pair of lower side shield walls 90a, 90b. The lower side shield walls 90a, 90b are connected to the longitudinal beams 13 by a floating spring 44. The floating spring 44 allows the lower side shield walls 90a, 90b and the secondary coulters 40 connected thereto to move upward when in contact with a hard object, such as a rock. The floating spring 44 is connected to a mount 43 that is positioned between the longitudinal beams 13.

The fourth member of the tilling assembly 18a–18d, the tiller wheel assembly 50, is clearly depicted in FIGS. 3, 4, and 5A. The tiller wheel assembly 50 includes a tiller wheel 52 having a diameter substantially greater than the diameters of each coulter 20, each tiller disc 30, and each secondary coulter 40. By way of example the tiller wheel 52 preferably has a diameter of 38 inches and a thickness of 0.5 inches. Surrounding the outer perimeter of the tiller wheel 52 is a plurality of blade apertures 54, and each blade aperture 54 is adapted to connect to receive and mount a cutting tool 56. Each cutting tool 56 is used to prepare the soil 6 and aggregate the soil in a row ridge 6B (see FIG. 5B). The cutting tools 56 can be one of several different embodiments, such as a straight razor blade or a curved blade, among other examples known in the art. The spacing between each cutting tool 56 surrounding the tiller wheel 52 is varied depending upon the soil to be prepared.

Looking at FIG. 5A, the tiller wheel assembly 50 is further connected to a pair of tiller wheel shafts 58, and each tiller wheel shaft 58 is attached to a gear box 66 connected as hereinafter described, which is connected to a power take off unit (not illustrated) of the associated tractor. The tiller wheel shafts 58 rotate the tiller wheel assembly 50 in a direction that is preferably opposite of the direction of rotation of the coulter 20, the tiller discs 30, and the secondary coulters 40 which are rotated merely by the passage of the apparatus over the ground. Each tiller wheel 52 is connected to one of the tiller wheel shafts 58, and the attachment of the tiller wheel 52 with the tiller wheel shaft 58 is reinforced by a pair of shaft hubs 60 that are also mounted to the tiller wheel shaft 58.

Looking at FIG. 5A, each tiller wheel shaft 58 is connected to the outer longitudinal beams 13a, 13b via a bearing block 64. Therefore, one end of the tiller wheel shaft 58 is connected to the bearing block 64, while the other end of the tiller wheel shaft 58 is connected to the right angle gear box 66 with a shear pin connection as is well known in the art to prevent damage should the wheel assembly encounter an immovable object while under power. The tiller wheel shafts 58 are connected to the gear box shaft 66a. The gear box shaft 66a is connected to a pair of shear pin couplings that are positioned within safety collars 67. The shear pin couplings maintain alignment of the tiller wheel shafts 58 and the gear box shaft 66a. The safety collars 67 are provided over the shear pin coupling to prevent the separation of the shafts when the shear pins are broken. The right angle box 66 is a part of a drive train 68 that serves to rotate the tiller wheel shafts 58 so as to allow rotation of the tiller wheel assembly 50, as described herein.

Looking further at FIG. 5A, the tiller wheels 52 are bolted to hubs 60 that have flanges that are mounted at an angle approximately 8 degrees. The magnitude of the angle will depend upon the desired width of the tilled row. This angular movement is frequently referred to as the wobble effect. When the tiller wheel 52 is mounted to the tiller wheel shaft 58 at such an angle, the cutting tools 56 attached to the tiller wheel 52 will prepare a wider row of soil 6 than when the tiller wheel 52 is perpendicular with the tiller wheel shaft 58. As a result, the angular displacement of the tiller wheel 52 will determine the total area tilled by the tilling wheel 52. The width of the area of soil 6 tilled may vary from three to five inches depending on the flange angle. Moreover, this angular movement of the tiller wheel 52 prevents each succeeding cutting tool 56 from tilling the exact same ground as the preceding cutting tool 56. Furthermore, looking at FIG. 4, the tiller wheel 52 is made of two semi-circular halves 52a, 52b such that the tiller wheel 52 may easily be removed and replaced without disturbing the tiller wheel shaft 58 and the shaft hub 60.

As stated above, the tiller wheel is rotated in a counter-clockwise direction or opposite the direction of the other elements being rotated via engagement with the ground. The purpose of the counter-rotation is to take advantage of the fact that soil is weak in tensile strength and thus will break up easily. The rotation tends to compress the soil thus shearing the soil which requires more force and tend to break up the soil into smaller pieces.

Looking at FIG. 2, the drive train 68 for rotating the tiller wheel assembly 50 of the present invention is illustrated. Each tiller wheel assembly 50 is mounted on a tiller wheel shaft 58, with the tiller wheel shaft 58 rotating the tiller wheel assembly 50 in a direction opposite the rotation of the coulter 20, the tiller disc wheels 30, and the secondary coulters 40. The means for rotating the tiller wheel assembly 50 includes a power take off shaft (PTO shaft) 70 that is connected to the tractor or other vehicle pulling the row tiller assembly 10. The PTO shaft 70 is connected to the tractor by a universal joint 71 to allow the tractor to rotate the PTO shaft 70 (generally at a rate of 1000 rpm). The PTO shaft 70 is additionally connected via a universal joint (not illustrated) to an adjustable overload safety clutch (not illustrated) mounted on a transmission 72. The transmission 72 is required to reduce the speed of the PTO shaft 70 so that the cutting tools will operate within the speed range desired for preparing the soil 6, as directed by the desired depth of soil 6 to be tilled and the speed of travel. The output from the transmission 72 is connected by a telescoping adjustable shaft 72 with a universal joint 73 that is additionally connected to drive shaft 74 to adjust for misalignment and flexing of the row tiller assembly 10 when in use. The drive shaft 74 connects the transmission 72 to a high-low transmission 76 to provide for reduction in speed provided to the shaft connected to the final drive gear box 66.

Looking at FIG. 5A, the gear box 66 is a right angle speed reducer having a gear ratio of 3 to 1, and is connected to the tiller wheel shafts 58 on each side of the row tiller assembly 10. The gear box 66 preferably has one input pinion gear 65A and one ring gear 65B mounted to provide counter rotation of the tiller wheels 52. The gears cause the tiller wheel shafts 58 to rotate in a counter-clockwise direction. This direction of rotation tends to reduce the compaction of the soil 6 as well as to minimize damage to the soil structure. The rotary speed of the tiller wheel assembly 50 is also important in relation to the ground speed of the pulling tractor to determine the amount of tilling effected upon the soil 6, and this speed may be varied by the transmission 72 as well as by the gear box 66.

Looking at FIGS. 1A, 3, 4, and 5A, the tiller wheel assembly 50 of each tilling assembly 18a–18d is illustrated as covered by a shield 82. The shield 82 includes two side plates 84a, 84b and a joining plate 86 connecting the two side plates 84a, 84b. The two side plates 84a, 84b are generally arcuate (as illustrated in FIGS. 3 and 4), and extend upward from the longitudinal beams 13a, 13b of the tilling assembly 18a–18d. The joining plate 86 is connected around the outer perimeter of the two side plates 84a, 84b to connect the side plates 84a, 84b to each other and to reinforce the connection of the side plates 84a, 84b with the longitudinal beams 13a, 13b of each tilling assembly 18a–18d.

Looking at FIGS. 3, 4, and 5, the shield 82 is further shown having a pair of lower side shield walls 90a, 90b. The lower side shield walls 90a, 90b are connected to a shield mount 91 by a pair of shield floating springs 92. The shield mount 91 is further attached between the longitudinal beams 13a, 13b to provide a secure connection. The lower side shield walls 90a, 90b extend parallel to the longitudinal beams 13a, 13b, and are positioned close to the soil 6 that is being tilled. Consequently, if the lower side shield walls 90a, 90b contact the surface of the soil 6, the shield floating springs 92 allow the lower side shield walls 90a, 90b to be move according to the desired placement.

The shield 82 serves various purposes while in use with the row tiller assembly 10. First, the two side plates 84a, 84b and the joining plate 86 of the shield 82 prevent the soil 6 from being slung ahead of or onto the tractor or row tiller assembly 10 by the tiller wheel assembly 50. Additionally, the lower side shield walls 90a, 90b prevent the undesired movement of the soil 6 outside of the width of the row of prepared soil 6 desired by the user.

When the hydraulic cylinder rod 100 is extended, the position of the frame is lowered, thus raising the rear main frame along with the tiller wheel assembly 50 at the same time raising the coulter by the distal linking arm 110. When the hydraulic cylinder rod 100 is retracted, the lift wheels are raised, thus lowering the main frame in respect to the tiller wheel assembly 50. Each hydraulic cylinder 97 has an adjustable clamp (not illustrated) to control the stop position and elevation of the row tiller assembly 10.

As described above, to raise the row tiller assembly 10, the piston rod 100 is extended outward from the hydraulic cylinder 97 such that the frame is raised with respect to the pivoting connection between the lift arm 98 and the piston rod 100. To lower the row tiller assembly 10, the piston rod 100 is retracted into the hydraulic cylinder 97. The row tiller assembly 10 can thereby be positioned above the ground as required. This aspect is beneficial in the preparation of the soil 6 in that the depth of tilling to be performed varies according to the soil 6 to be prepared. For example, soil 6 that has not recently been tilled would require a shallow depth, whereas constantly tilled soil 6 would require a greater depth of tilling.

During tilling operation, the row tiller assembly 10 is used to provide a plurality of prepared rows 6B of soil 6 for planting vegetation, each row of prepared soil 6B being separated from the adjacent row of prepared soil 6B by a row of unprepared soil 6C (see FIG. 5B). In the preferred embodiment, the width of the prepared soil is between eight to twelve inches, although the width could easily be extended or reduced by the angle of placement of tiller wheel assembly 50 and the tiller wheels 52. The width of each unprepared row of soil separating the prepared rows of soil is ideally between twenty-four and thirty-six inches, although this measurement could also be adjusted by changing the distances between each adjacent tilling assembly 18a–18d attached to the frame.

In operation, the row tiller assembly 10 is pulled by a tractor over a tract of soil 6 such that the soil 6 will be cultivated in multiple rows 6B. This division of the soil 6 between tilled rows 6B and untilled rows 6C is beneficial in that energy is not wasted in preparing soil that will not be used, and the soil is further not overtilled so as to cake and become hard after a period of rainfall. Moreover, the row tiller assembly 10 increases the volume of the soil in the prepared ridge of soil 6B by increasing the depth of tilling and by including sub-soil with surface soil to increase the total volume of soil which provides a greater area for plant roots.

The soil ridge 6B is preferably formed in the fall is very rough and is not intended to provide loose soil as needed for planting seed. After the soil ridges 6B have been formed, no further operation will be needed until spring planting except the operations needed for weed control. The breakup of the soil 6 for a spring planting of crops is done by weathering during the fall, winter, and spring by the wetting, drying, freezing and thawing. As a result, the method using the row tiller assembly 10 of the present invention reduces the energy and labor required for farming. Additionally, this design therefore varies from previous tillage methods by producing the minimal break-up of the soil so that it can produce the row ridge that is porous to facilitate the accumulation of water for seed germination and plant growth.

Moreover, the method of row preparation using the present row tiller assembly 10 involves using approximately one-half of the total crop area, with the remainder being of inner row area for equipment traffic and crop residues cover crop to protect the inter-row from erosion by environmental elements such as wind or water. The spacing between rows of prepared soil 6B depends upon the type of crop to be produced.

The design of the row tiller assembly 10 of the present invention provides several advantages in addition to those mentioned above. This design makes it possible for a user to till the soil after harvest of crops to prepare for the next planting season. Typically, such a farming procedure could not be done with the prior art methods described above due to the fact that if the soil was overtilled after harvest, it would compact and cake during the winter season until the next planting time arrived. However, by tilling the soil in the rows as described above, the soil is not overtilled. Consequently, the soil may be tilled after harvest and left untouched for a plurality of months until time to plant again in the next season.

In addition to the design described above, other embodiments could include conventional accessories, such as dispensers of chemical fertilizers and insecticides. Moreover, additional tools may be included to cut grass while allowing the grass to remain between rows to reduce erosion of the soil.

Thus, although there have been described particular embodiments of the present invention of a new and useful IMPROVED ASSEMBLY AND METHOD FOR TILLING SOIL, it is not intended that such references be construed as limitations upon the scope of this invention except as set forth in the following claims.

What is claimed is:

1. An apparatus for building up at least one row of soil with a minimum amount of soil structure breakdown to prepare for sowing seeds, the apparatus comprising:
    a frame including a pair of cross-beam supports and a set of longitudinal beams;
    support wheels mounted to said frame for selective positioning of said frame at a selected height and
    a tilling assembly connected to said frame for preparing the row of soil, said tilling assembly including:
        a coulter resiliently attached to said longitudinal beams;
        a first tiller disc and a second tiller disc resiliently attached to said longitudinal beams by a connecting arm;
        a positioning plate attached to said connecting arm, said positioning plate having a first and second end;
        a first and second wedge end, said first wedge end connected to said first end of said positioning plate and said second wedge end connected to said second end of said positioning plate;
        a first and second mounting sleeve, said first mounting sleeve attached to said first wedge end and said second mounting sleeve attached to said second wedge end; and
        a first and second tiller disc shaft having a distal and proximal end, wherein said proximal end of said first tiller disc shaft is rotatably positioned in said first mounting sleeve and said distal end of said first tiller disc shaft is attached to said first tiller disc, and said proximal end of said second tiller disc shaft is rotatably positioned in said second mounting sleeve and said distal end of said second tiller disc shaft is attached to said second tiller disc; and
        a tiller wheel assembly attached to said longitudinal beams, said tiller wheel assembly including a tiller wheel and a plurality of cutting tools, said plurality of cutting tools connected to the periphery of said tiller wheel;
    wherein said tilling assembly engages the soil to prepare a row ridge of soil for receiving seed.

2. The apparatus of claim 1 wherein said tiller wheel assembly further includes:
    a tiller wheel shaft supported for driven rotation on said frame; and
    a shaft hub mounted to said tiller wheel shaft.

3. The apparatus as defined in claim 2 wherein said tiller wheel has formed therein a plurality of mounting apertures for detachably receiving said cutting tools.

4. The apparatus as defined in claim 2 wherein said tiller wheel comprises a pair of disc segments each forming one half of said tiller wheel and means for affixing said disc segments to said hub and each other.

5. The apparatus as defined in claim 2 further comprising a drive train for transmitting motive force from an associated towing vehicle to rotate said tilling wheel.

6. The apparatus of claim 1 further comprising a housing, said housing including a pair of side plates and a joining plate connected between said side plates, said housing substantially surrounding said tiller wheel assembly and adapted to form soil tilled thereby into a row.

7. The apparatus of claim 6 wherein said housing further comprises a pair of vertical walls attached to said longitudinal beams and extending downwardly toward the soil and an arcuate upper wall affixed to said vertical walls and covering said wheel assembly.

8. The apparatus of claim 1 comprising at least four tilling assemblies for preparing at least four row ridges of soil to receive seed separated by rows of untilled soil.

9. The apparatus of claim 1 wherein said tilling assembly further includes a pair of secondary coulters resiliently connected to said longitudinal beams.

10. The apparatus of claim 9 wherein said tilling assembly further comprises an auxiliary spring mount connected between said secondary coulters and said longitudinal beam, said auxillary spring mount determining the force of said pair of tiller discs applied to the soil.

11. The apparatus of claim 1 wherein said tilling assembly further comprises an agitating tool connected in proximate relation to said coulter.

12. The apparatus of claim 1 further comprising means for elevating said frame connected between said frame and said support wheels.

13. The apparatus of claim 12 wherein said means for elevating said frame includes:
    a first and second lift arm, each lift arm having a primary end and a secondary end, said primary end of said first lift arm attached to said first wheel spindle and said primary end of said second lift arm attached to said second wheel spindle, said secondary ends of said first and second lift arms affixed to a lift wheel axle extending transversely of said frame; and
    a first and second hydraulic cylinder, said first and second hydraulic cylinders each attached to said frame and to an associated one of said first and second lift arms.

14. The apparatus of claim 13 wherein said means for elevating said frame further comprises a linkage connected between said coulter and said lift wheel axle, said linkage determining the elevation of said coulter relative to the soil.

15. The apparatus of claim 1 wherein said first tiller disc shaft slidably engages said first mounting sleeve and said second tiller disc shaft slidably engages said second mounting sleeve to vary the distance between said first tiller disc and said second tiller disc.

16. The apparatus of claim 1 wherein said first wedge end is pivotally connected to said first end of said positioning plate and said second wedge end is pivotally connected to said second end of said positioning plate.

17. The apparatus of claim 1 wherein said coulter and said pair of tiller discs rotate in a first direction to till the soil and said tiller wheel assembly rotates in a second direction to till the soil.

18. A method for tilling ground soil for improving the growth of seed in the soil, the method comprising the steps of:
    providing a tiller having a frame and a tilling assembly connected to said frame via a pair of longitudinal beams, said tilling assembly comprising a first tiller disc and a second tiller disc resiliently attached to said longitudinal beams by a connecting arm, a positioning plate attached to said connecting arm, said positioning plate having a first and second end, a first and second wedge end, said first wedge end connected to said first end of said positioning plate and said second wedge end connected to said second end of said positioning plate; a first and second mounting sleeve, said first mounting sleeve attached to said first wedge end and said second mounting sleeve attached to said second wedge end; and a first and second tiller disc shaft having a distal and proximal end, wherein said proximal end of said first tiller disc shaft is rotatably positioned in said first mounting sleeve and said distal end of said first tiller disc shaft is attached to said first tiller disc, and said proximal end of said second tiller disc shaft is rotatably positioned in said second mounting sleeve and said distal end of said second tiller disc shaft is attached to said second tiller disc;

pulling said tiller across the ground soil;

engaging the soil with said tilling assembly;

accumulating a plurality of separate and distinct row ridges of soil with said tilling assembly to receive seed such that said row ridges are separated by row troughs; and planting the seeds in said row ridge.

19. The method as described in claim 18, wherein the step of accumulating a plurality of separate and distinct rows of soil with said tilling assembly includes:

slashing the soil with a coulter resiliently connected to said longitudinal beams; and gathering the soil into a row with a pair of tiller discs resiliently connected to said longitudinal beams.

20. The method as described in claim 19, wherein after the step of gathering the soil with a pair of tiller discs, further including the step of engaging the soil with a secondary coulter.

21. The method as described in claim 18, wherein the step of accumulating a plurality of separate and distinct rows of soil with said tilling assembly includes:

rotating a coulter and a pair of tiller discs resiliently connected to said longitudinal beams in a first direction; and rotating a tiller wheel assembly including a tiller wheel and a plurality of blades attached to said tiller wheel in a second direction.

22. A soil tilling apparatus for preparing a row ridge of soil to prepare the soil to receive seed for growing crops, the soil tilling assembly comprising:

a frame;

propelling means attached to said frame to support said frame on a ground surface; and tilling assembly for preparing the row ridge of soil, said tilling assembly comprising a plurality of tilling implements mounted in series to said frame, said tilling implements comprising:

a coulter resiliently attached to said frame;

a pair of coincidentally spaced tiller discs resiliently attached to said frame by a connecting arm;

a positioning plate attached to said connecting arm, said positioning plate having a first and second end;

a first and second wedge end, said first wedge end connected to said first end of said positioning plate and said second wedge end connected to said second end of said positioning plate;

a first and second mounting sleeve, said first mounting sleeve attached to said first wedge end and said second mounting sleeve attached to said second wedge end; and a first and second tiller disc shafts having a distal and proximal end, wherein said proximal end of said first tiller disc shaft is rotatable positioned in said first mounting sleeve and said distal end of said first tiller disc shaft is attached to one of said pair of tiller discs, and said proximal end of said second tiller disc shaft is rotatably positioned in said second mounting sleeve and said distal end of said second tiller disc shaft is attached to one of said pair of tiller discs; and a tiller wheel assembly attached to said frame, said tiller wheel assembly including a slanted tiller wheel and a plurality of cutting tools, said plurality of cutting tools connected to the periphery of said tiller wheel;

wherein said tilling assembly engages the soil to define a row ridge of soil.

23. The apparatus of claim 22 wherein said frame comprises a pair of longitudinal beams and a pair of cross-beam supports, said longitudinal beams connected between said cross-beam supports.

24. The apparatus of claim 22 wherein said propelling means includes a pair of wheels and a wheel spindle connected to said frame, said wheels rotatably connected to said wheel spindle to support said frame on a ground surface.

25. The apparatus of claim 24 further comprising a means for elevating said frame connected between said frame and said wheel spindle.

26. The apparatus of claim 25 wherein said means for elevating said frame includes:

a lift arm having a primary and a secondary end, said primary end of said lift arm attached to said wheel spindle; and a hydraulic cylinder attached to said frame, said hydraulic cylinder including a piston rod pivotally attached to said secondary end of said lift arm such that said piston rod raises said frame when said piston rod extends from said hydraulic cylinder.

27. The apparatus of claim 22 comprising at least four tilling assemblies for preparing at least four row ridges of soil separated by rows of untilled soil.

28. The apparatus of claim 22 wherein said tilling assembly further includes a pair of secondary coulters resiliently connected to said frame.

29. The apparatus of claim 28 wherein said tilling assembly further comprises an auxiliary spring mount connected between said secondary coulters and said frame.

30. The apparatus of claim 22 wherein said tilling assembly further comprises a tool connected in proximate relation to said coulter.

31. The apparatus of claim 22 wherein said tiller wheel assembly further includes:

a pair of bearing block connected to said frame;

a tiller wheel shaft connected to said bearing blocks; and a shaft hub mounted to said tiller wheel shaft;

wherein said tiller wheel rotates with said tiller wheel shaft in said bearing blocks.

32. The apparatus of claim 22 further comprising a shield, said shield including a pair of side plates and a joining plate connected between said side plates, said shield substantially surrounding said tiller wheel assembly.

33. The apparatus of claim 32, wherein said shield further comprises a pair of shield walls attached to said frame and extending downwardly toward the soil.

34. The apparatus of claim 22 wherein said tilling assembly further comprises a primary spring mount connected between said coulter and said frame.

35. The apparatus of claim 22 wherein said tilling assembly further comprises a secondary spring mount connected between said pair of tiller discs and said frame.

36. A method for preparing soil to receive seed with a soil tiller, the method comprising the steps of:

a. piercing the soil with a coulter connected to the soil tiller;

b. engaging the soil with a first concave tilling disc and a second concave tilling disc resiliently attached to a longitudinal beam attached to the soil tiller by a connecting arm; a positioning plate attached to said connecting arm, said positioning plate having a first and second end; a first and second wedge end, said first wedge end connected to said first end of said positioning plate and said second wedge end connected to said second end of said positioning plate; a first and second mounting sleeve, said first mounting sleeve attached to said first wedge end and said second mounting sleeve attached to said second wedge end; and a first and second tiller disc shaft having a distal and proximal end, wherein said proximal end of said first tiller disc shaft is rotatably positioned in said first mounting sleeve and said distal end of said end of said first tiller disc shaft is attached to said first tiller disc, and said proximal end of said second tiller disc shaft is rotatably positioned in said second mounting sleeve and said distal end of said second tiller disc shaft is attached to said second tiller disc;

c. directing the soil into a ridge of soil by said tilling discs;

d. contacting the soil with a tiller wheel assembly rotating in a direction opposite said tilling discs, said tiller wheel assembly connected to the soil tiller;

e. building a ridge of soil between two rows of untilled soil such that said ridge of soil will aptly receive water form said untilled soil; and f. sowing the seed in said ridge.

\* \* \* \* \*